US010620361B2

(12) United States Patent
Bang et al.

(10) Patent No.: US 10,620,361 B2
(45) Date of Patent: Apr. 14, 2020

(54) SUPER DIRECTIONAL LIGHT GUIDE FILM AND THIN FILM TYPE BACK LIGHT UNIT FOR FLAT PANEL DISPLAY USING THE SAME

(71) Applicants: LG DISPLAY CO., LTD., Seoul (KR); COVESTRO DEUTSCHLAND AG., Leverkusen (DE)

(72) Inventors: Hyungseok Bang, Goyang-si (KR); Seungman Ryu, Paju-si (KR); Friedrich-Karl Bruder, Krefeld (DE)

(73) Assignees: LG DISPLAY CO., LTD., Seoul (KR); COVESTRO DEUTSCHLAND AG., Leverkusen (DE)

( * ) Notice: Subject to any disclaimer, the term of this patent is extended or adjusted under 35 U.S.C. 154(b) by 812 days.

(21) Appl. No.: 14/959,627

(22) Filed: Dec. 4, 2015

(65) Prior Publication Data
US 2016/0187556 A1    Jun. 30, 2016

(30) Foreign Application Priority Data
Dec. 31, 2014    (KR) .................. 10-2014-0195764

(51) Int. Cl.
*G02B 6/00* (2006.01)
*F21V 8/00* (2006.01)

(52) U.S. Cl.
CPC ............ *G02B 6/005* (2013.01); *G02B 6/0031* (2013.01); *G02B 6/0045* (2013.01); *G02B 6/0055* (2013.01)

(58) Field of Classification Search
CPC .............. G02B 6/00538; G02B 6/0036; G02B 6/0068; G02B 6/0053; G02B 6/0061; G02B 6/0055; G02B 6/005; G02B 6/0011; G02B 6/0033; G02B 6/0035; G02B 6/0045; G02B 6/0046
See application file for complete search history.

(56) References Cited

U.S. PATENT DOCUMENTS

| 6,250,758 B1 * | 6/2001 | Yoshihara | B32B 15/08 351/159.63 |
| 7,430,355 B2 * | 9/2008 | Heikenfeld | G02B 26/02 385/129 |
| 7,453,639 B2 * | 11/2008 | Katsura | G02B 5/021 359/453 |

(Continued)

FOREIGN PATENT DOCUMENTS

| EP | 3023819 A1 | 5/2016 |
| JP | 2004171948 A | 6/2004 |

(Continued)

*Primary Examiner* — Y M. Lee
(74) *Attorney, Agent, or Firm* — Dentons US LLP

(57) ABSTRACT

Provided is a back light unit for a display device that has a light guide film. The light guide film includes, for example, a light entering part at a first side; a light reflecting part disposed at a second side; and a light guiding part between the light entering part and the light reflecting part, wherein the light entering part selectively sends an incident light of an expanded light provided from a light source that satisfies a total reflection condition toward the light guiding part, and wherein the light reflecting part converts the incident light provided from the light guiding part into a collimated light and sends it to the light guiding part.

19 Claims, 11 Drawing Sheets

(56) References Cited

U.S. PATENT DOCUMENTS

| | | | | |
|---|---|---|---|---|
| 8,092,063 B2* | 1/2012 | Isoda | ................... | G02B 6/0061 |
| | | | | 362/608 |
| 8,872,992 B2* | 10/2014 | Kee | ...................... | G09G 3/3426 |
| | | | | 349/58 |
| 8,926,160 B2* | 1/2015 | Iwasaki | ................ | G02B 6/0041 |
| | | | | 362/558 |
| 8,995,807 B1* | 3/2015 | Jalava | ...................... | G02B 6/34 |
| | | | | 385/37 |
| 9,022,636 B2* | 5/2015 | Hu | ....................... | G02B 6/0083 |
| | | | | 362/249.02 |
| 9,039,268 B2* | 5/2015 | Ma | ........................ | G02B 6/0011 |
| | | | | 362/555 |
| 9,625,624 B2* | 4/2017 | Oh | ........................ | G02B 5/0242 |
| 9,671,528 B2* | 6/2017 | Shimada | .............. | G02B 5/0231 |
| 2004/0246743 A1 | 12/2004 | Lee et al. | | |
| 2006/0056200 A1 | 4/2006 | Yamashita et al. | | |
| 2007/0126950 A1 | 6/2007 | Kurihara | | |
| 2012/0063166 A1* | 3/2012 | Panagotacos | .......... | G02B 6/002 |
| | | | | 362/609 |
| 2013/0307831 A1 | 11/2013 | Robinson et al. | | |
| 2014/0376258 A1 | 12/2014 | Wu et al. | | |

FOREIGN PATENT DOCUMENTS

| | | | |
|---|---|---|---|
| JP | 2004319364 A | 11/2004 | |
| JP | 2006-031941 A | 2/2006 | |
| JP | 2007-157540 A | 6/2007 | |
| JP | 2008-027905 A | 2/2008 | |
| JP | 2010-251231 A | 11/2010 | |
| TW | 201439593 A | 10/2014 | |
| WO | 1997017631 A1 | 5/1997 | |
| WO | 2013/137161 A1 | 9/2013 | |
| WO | 2013/167832 A1 | 11/2013 | |

\* cited by examiner

SUPER DIRECTIONAL LIGHT GUIDE FILM AND THIN FILM TYPE BACK LIGHT UNIT FOR FLAT PANEL DISPLAY USING THE SAME

This application claims the benefit of Korea Patent Application No. 10-2014-0195764 filed on Dec. 31, 2014, which is incorporated herein by reference for all purposes as if fully set forth herein.

BACKGROUND OF THE INVENTION

Field of the Invention

The present disclosure relates to a display device and a method of manufacturing the same. More particularly, the present disclosure relates to a thin film type back light unit for a flat panel display device.

Discussion of the Related Art

Nowadays, liquid crystal display (LCD) devices are widely used for display applications such as portable computers, notebook PCs, office automation devices, audio/video devices, advertising displays for indoor or outdoor, and so on. A typical transmittive type LCD device displays an image by modulating the luminescence of the light incident from the backlight unit by controlling the electric field applied to the liquid crystal layer.

There are typically two types of back light unit: a direct type and an edge type. The direct type back light unit has a structure in which a plurality of optical sheets and a diffusion plate are stacked under the liquid crystal panel and a plurality of light sources are disposed under the diffusion plate.

FIG. 1 is a cross-sectional view illustrating a structure of an LCD device having a direct type back light unit including a light emitting diode (LED) array as a light source according to the related art.

The direct type back light unit DBLU includes a light source disposed under a liquid crystal panel LCDP and radiating a back light directly to the liquid crystal panel LCDP. The light source may be a thin fluorescent lamp. Alternatively, as shown in FIG. 1, the light source may be an LED array LEDAR having a lower power consumption and enhanced luminescence.

The LED array LEDAR is disposed in a matrix on the bottom surface of the case CASE. The case CASE may be installed at the cover bottom CB. In some cases, the case CASE may be omitted, and the LED array LEDAR may be disposed at the cover bottom CB directly. On the LED array LEDAR, a diffusion plate DIFF is disposed. The diffusion plate DIFF diffuses the back light from the LED array LEDAR to provide an evenly scattered back light over the light incident surface of the liquid crystal panel LCDP. Between the diffusion plate DIFF and the liquid crystal panel LCDP, a plurality of optical sheets OPT may be disposed. The optical sheets OPT include one or more prism sheets, one or more diffusion sheets, and/or a dual brightness enhancement film (or DBEF). The prism sheets converse the scattered and/or diffused back light by the diffusion plate DIFF to the liquid crystal panel LCDP for enhancing the brightness of the back light. The diffusion sheets diffuse again the conversed back light by the prism sheets over the liquid crystal panel LCDP to have an evenly distributed luminescence.

A guide panel GP wraps and/or surrounds the side surfaces of the liquid crystal panel LCDP and the direct type back light unit DBLU, and supports the liquid crystal panel LCDP by being interposed between the liquid crystal panel LCDP and the optical sheets OPT. The cover bottom CB wraps and/or surrounds the case CASE and the bottom surface of the direct type back light unit. On the bottom surface of the case CASE having the LED array LEDAR, a reflective sheet REF is disposed to reflect the back light leaked from the diffusion plate DIFF and/or the optical sheets OPT to the liquid crystal panel LCDP. The top case TP surrounds the upper edge of the liquid crystal panel LCDP and the side surface of the guide panel GP.

In the meantime, the edge type back light unit may have a thinner thickness than the direct type back light unit. Currently, LCD devices have typically an LED light source rather than a fluorescent lamp. Due to easy installation of the light source, the edge type back light unit is more widely applied to various types of LCD devices, in which a plurality of LED light sources are disposed at a side surface of the liquid crystal panel.

Hereinafter, referring to FIG. 2, the edge type back light unit will now be described. FIG. 2 is a cross-sectional view illustrating a structure of an LCD device having an edge type back light unit including a light emitting diode array as a light source according to the related art.

Referring to FIG. 2, the edge type back light unit comprises a cover bottom CB, a light guide LG disposed at a bottom surface of the cover bottom CB, and a light source disposed between the side surface of the light guide LG and the cover bottom CB and providing a back light to the side surface of the light guide LG.

The light source may be a thin fluorescent lamp. Alternatively, as shown in FIG. 2, the light source may be an LED array LEDAR having a lower power consumption and enhanced luminescence. The light source may be disposed at the side surface of the light guide LG using an installing means such as a housing. The light guide LG receives the back light from the LED array LEDAR and refracts the direction of the back light as being perpendicular to the light incident surface of the liquid crystal panel LCDP. Between the light guide LG and the liquid crystal panel LCDP, a plurality of optical sheets OPT are disposed. The optical sheets OPT include one or more prism sheets, and one or more diffusion sheets for scattering and/or diffusing the back light from the light guide LG. To enhance the brightness and/or luminescence, the optical sheets OPT may further include a dual brightness enhancement film (or DBEF).

The guide panel GP wraps and/or surrounds the side surfaces of the liquid crystal panel LCDP and the edge type back light unit, and supports the liquid crystal panel LCDP by being interposed between the liquid crystal panel LCDP and the optical sheets OPT. Between the cover bottom CB and the light guide LG, a reflective sheet REF is disposed to reflect the back light leaked from the diffusion plate DIFF and/or the optical sheets OPT to the liquid crystal panel LCDP. The top case TP surrounds the upper edge of the liquid crystal panel LCDP and the side surface of the guide panel GP.

As described above, an LCD device, which is a non-self-luminance display, typically has a back light unit. The back light unit is desired to direct the back light evenly distributed over the whole surface of the liquid crystal panel. As such, various optical devices and/or means are typically used to transform a light from a point light source or a line light source to a light from a plane light source. Due to the optical characteristics and structures of these optical devices and/or means, the back light unit is typically ended up with some thickness. Even though flat panel display devices such as LCD devices have a remarkably slimmer profile than conventional display devices such as cathode ray tubes, more advanced technology for developing a new back light unit suitable for a slimmer and lower power consumption display device is desired.

SUMMARY OF THE INVENTION

Accordingly, the present invention is directed to a display device and a method of manufacturing the same that substantially obviate one or more problems due to limitations and disadvantages of the related art.

An advantage of the present invention is to provide a display device with a thin back light unit.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device having a display panel and a back light unit is disclosed, wherein the back light unit may, for example, include a light guide film including a light entering part at a first side, a light reflecting part at a second side and a light guiding part between the light entering part and the light reflecting part; a light radiating part on an upper surface of the light guide film; and a light source adjacent to the light entering part of the light guide film, the light source providing an expanded light toward the light entering part, wherein the light entering part selectively sends an incident light of the expanded light that satisfies a total reflection condition toward the light guiding part, wherein the light reflecting part converts the incident light provided from the light guiding part into a collimated light and sends it to the light guiding part, and wherein the light radiating part provides a back light to the display panel as the collimated light propagates through the light guiding part.

In another aspect of the present disclosure, a back light unit having a light guide film is disclosed wherein the light guide film may, for example, include a light entering part at a first side; a light reflecting part disposed at a second side; and a light guiding part between the light entering part and the light reflecting part, wherein the light entering part selectively sends an incident light of an expanded light provided from a light source that satisfies a total reflection condition toward the light guiding part, and wherein the light reflecting part converts the incident light provided from the light guiding part into a collimated light and sends it to the light guiding part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

First Embodiment

Hereinafter, a thin film type back light unit according to the first embodiment of the present disclosure will be described with reference to FIGS. 3 to 8. First, a structure of a thin film type back light unit according to the first embodiment of the present disclosure will be described with reference to FIG. 3.

Figure 1:
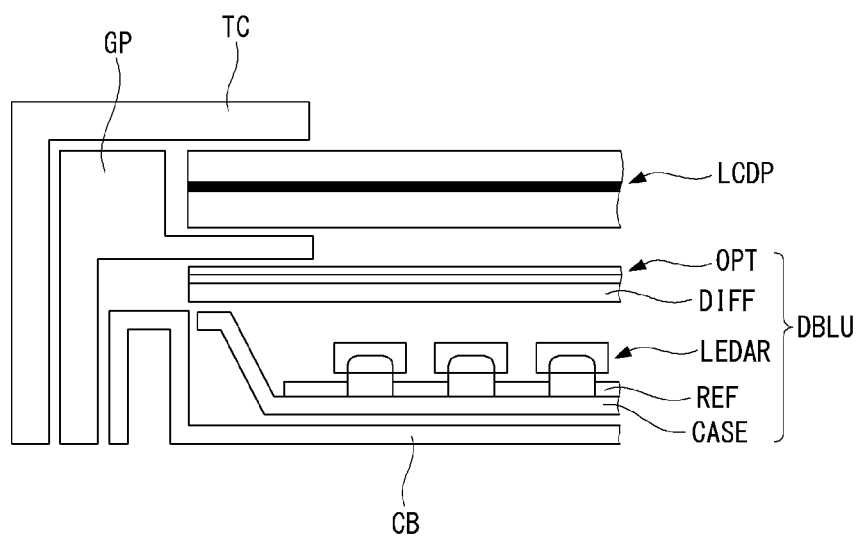
FIG. 1 is a cross-sectional view illustrating a structure of a liquid crystal display having a direct type back light unit including a light emitting diode array as a light source according to the related art.
Figure 2:
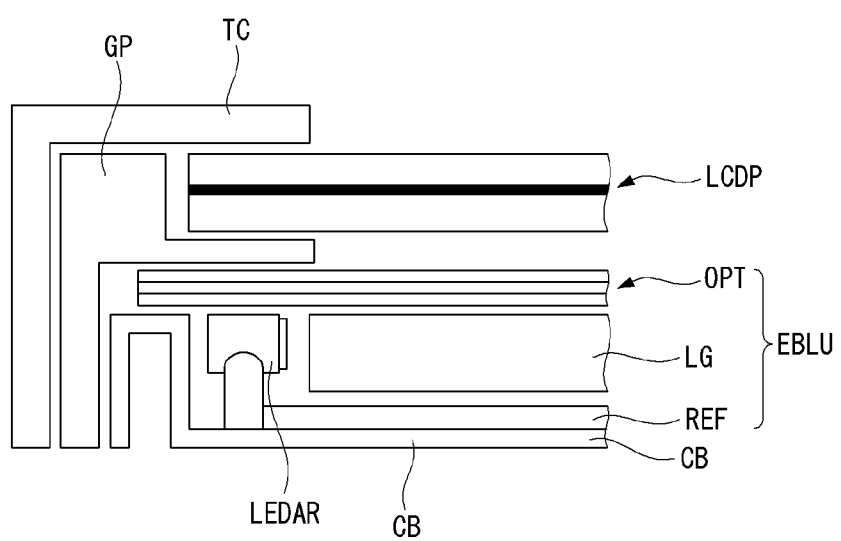
FIG. 2 is a cross-sectional view illustrating a structure of a liquid crystal display having an edge type back light unit including a light emitting diode array as a light source according to the related art.
Figure 3:
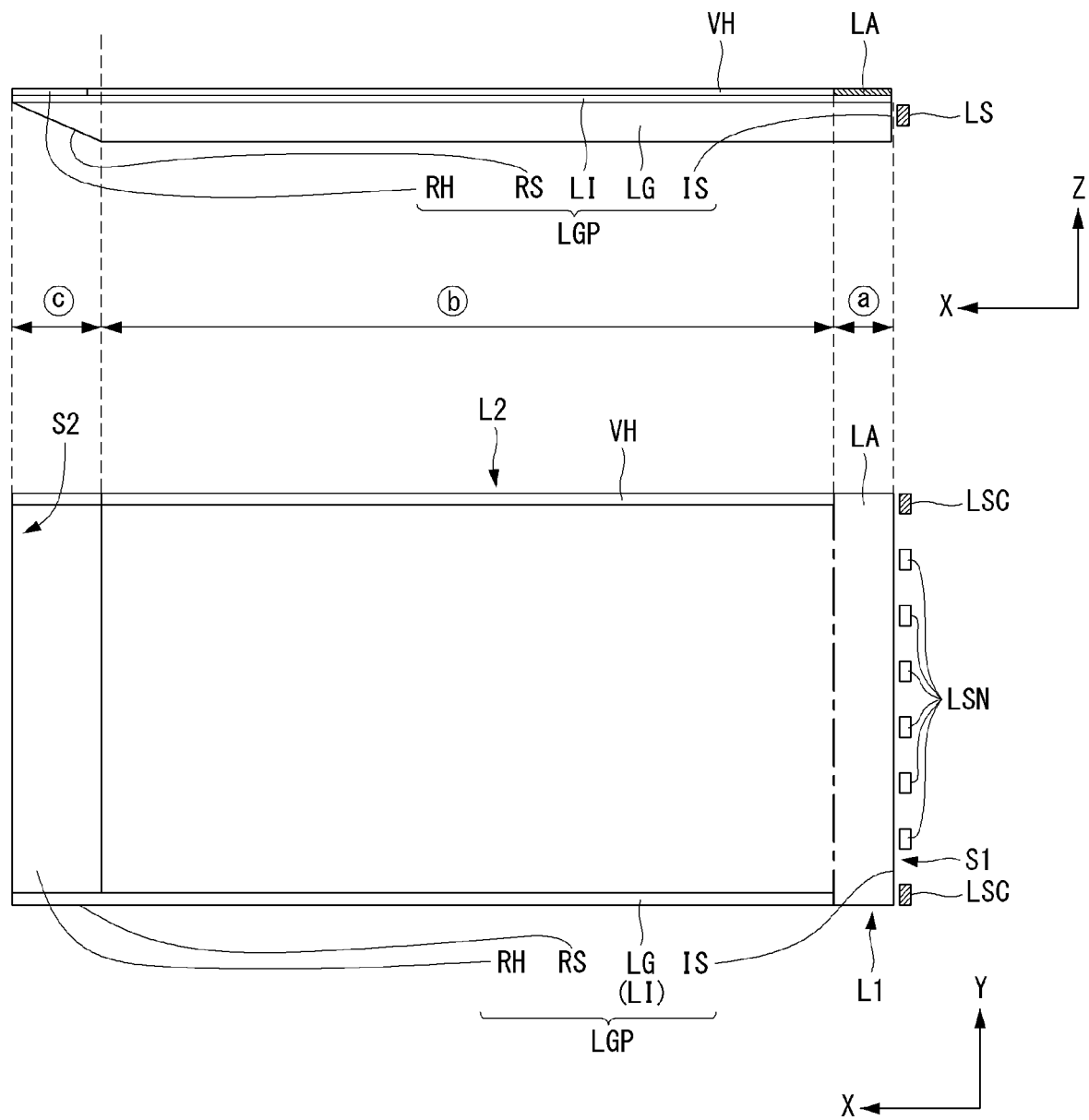
FIG. 3 is a diagram illustrating a structure of a thin film type back light unit according to the first embodiment of the present disclosure.

FIG. 3 is a diagram illustrating a structure of a thin film type back light unit according to the first embodiment of the present disclosure. The upper part of FIG. 3 is a plane view as seen from an upside of the thin film type back light unit, and the lower part is a side view as seen from a lateral side. For ease of understanding, coordinate axes are provided at one corner of FIG. 3.

The thin film type back light unit according to the first embodiment of the present disclosure comprises a light guide film LGP, a light source LS, a light absorbing pattern LA, a light reflecting pattern RH and a light radiating pattern VH. The light guide film LGP includes a light entering part ⓐ where the light absorbing pattern LA is disposed, a light reflecting part ⓒ where the light reflecting pattern RH is disposed and a light guiding part ⓑ which is connecting the light entering part ⓐ and the light reflecting part ⓒ. The light source LS is disposed near the light entering part ⓐ. Further, the light radiating pattern VH is disposed on an upper surface of the light guide film LGP for radiating some of the light passing through the light guiding part ⓑ to an upper space of the light guide film LGP.

The light guide film LGP may be made of a thin film material having a rectangular shape. For example, the light guide film LGP has two long sides L1 and L2, which are parallel and apart from each other with a predetermined distance, and two short sides S1 and S2, which are crossing the long sides L1 and L2. As illustrated in the lower part of FIG. 3, the lower long side L1 and the upper long side L2 are the two long sides, and the right side S1 and the left side S2 are the two short sides.

The light guide film LGP comprises a high refractive film LG and a low refractive film LI an incident surface IS and a reflective surface RS. The high refractive film LG includes a plane part having the same thickness and a wedge part having a varying thickness. The low refractive film LI is disposed on the upper surface of the high refractive film LG. The low refractive film LI has the same shape and area as the high refractive film LG. For example, the high refractive film LG may be a transparent light media film of which refractive index is 1.60 or higher. The low refractive film LI may be a transparent light media film of which refractive index is larger than that of the air and lower than 1.50. The low refractive film LI may be a film type which is attached on the high refractive film LG. Alternatively, the low refractive film LI may be a layer type, in which a low refractive material is coated on the upper surface of the high refractive film LG. Herein, a film type of the low refractive film LI is described by way of example.

The right short side S1 of the high refractive film LG may be an incident surface IS where a source light for the back light enters. Further, the reflective surface RS is disposed at the left short side S2 where the light is reflected. Here, the reflective surface RS may be a plane wedge surface (or 'inclined surface') having an inclined angle (or 'wedge angle') of α°. Alternatively, the reflective surface RS may be a rounded wedge surface or an inclined arc surface. Herein, the inclined angle (or 'wedge angle') is the angle between the inclined surface (or rounded wedge surface) and the horizontal surface of the high refractive film.

The light source LS may be disposed at the incident surface IS of the light guide film LGP. The light source LS may include a 2D light source LSN and a 3D light source LSC. The 2D light source LSN may beneficially be disposed at a center of the incident surface IS. Further, the 3D light source LSC may beneficially be disposed at any one edge of the incident surface IS. The light absorbing pattern LA may be attached on the upper surface of the light guide film LGP near the light source LS. In the first embodiment, the position of the incident surface IS is not restricted thereto, but it can be located at any position on the incident surface IS.

The light reflecting pattern RH is disposed at the light reflecting part ⓒ. For example, the light reflecting pattern RH may be disposed to face the reflective surface RS or to be attached on the reflective surface RS. In FIG. 3, the light reflecting pattern RH is attached on the upper surface of the light guide film LGP, facing the reflective surface RS.

The light radiating pattern VH is disposed on the upper surface of the light guide film LGP, except the area where the light reflecting pattern RH is disposed. The area of the light radiating pattern VH can define an area of the actual back light of the back light unit. The light radiating pattern VH may have the subsequently same width as that of the high refractive film LG. In the plane view, the light radiating pattern VH has a smaller width than that of the high refractive film LG.

Hereinafter, an operation of the thin film type back light unit according to the first embodiment of the present disclosure will be described. First, the light entering part ⓐ and the light guiding part ⓑ will be described with reference to to FIG. 4.

Figure 4:
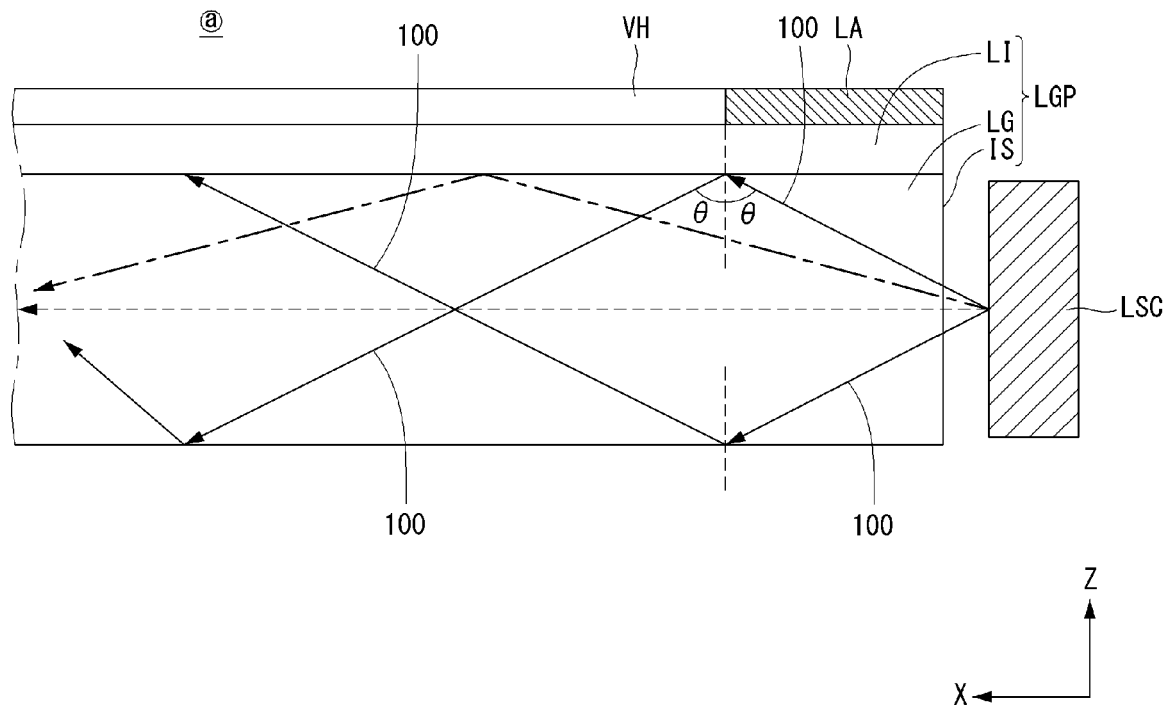
FIG. 4 is an enlarged side view illustrating a structure of a light entering part of a thin film type back light unit according to the first embodiment of the present disclosure.

FIG. 4 is an enlarged side view illustrating a structure of the light entering part of the thin film type back light unit according to the first embodiment of the present disclosure.

The light source LS is disposed near the incident surface IS of the light guide film LGP. The light guide film LGP has the high refractive film LG and the low refractive film LI. On the low refractive film LI, the light absorbing pattern LA is attached, covering a predetermined distance from the incident surface IS. On the low refractive film LI, the light radiating pattern VH is attached, except the area for the light absorbing pattern LA.

The light source LS may be the 2D light source LSN or the 3D light source LSC. Herein, a case of using the 3D light source LSC will be described by way of example. The light source LS may be an ultra-tiny light emitting diode. The light emitting diode may generate an expanded light of which radiating angle may be in a range of 60 degrees to 120 degrees.

At the light entering part ⓐ, the expanded light from the light source LS enters into the high refractive film LG through the incident surface IS. Among the expanded light entering into the high refractive film LG, the light satisfying a total reflection condition propagates through the light guide film LGP. The light unsatisfying the total reflection condition may travel out of the light guide film LGP, which may be considered a noise as not being used for the back light. The light unsatisfying the total reflection condition is beneficially removed by the light absorbing pattern LA.

When the incident angle larger than a critical angle for total reflection is θ, all of the expanded light having the incident angle (between the normal line to the upper surface of the high refractive film LG) less than θ may be removed by the light absorbing pattern LA. As a result, the expanded light having the incident angle equal to or larger than θ is selected as the incident light 100 and then enters into the high refractive film LG. The incident light 100 propagates through the high refractive film LG by a total reflection at the upper surface and the bottom surface of the high refractive film LG to an opposite side of the incident surface IS.

When observed in a plane view, the incident light 100 is an expanded light having a radiating angle of 60 degrees to 120 degrees. That is, the incident light 100 may not be used as the back light, because they are not evenly distributed over a whole surface of the light guide film LGP. The incident light 100 beneficially propagates within the high refractive film LG and does not travel out from the light guide film LGP.

Next, referring to FIGS. 5A, 5B and 6, the light reflecting part ⓒ and the light guiding part ⓑ will be described.

Figure 5A:
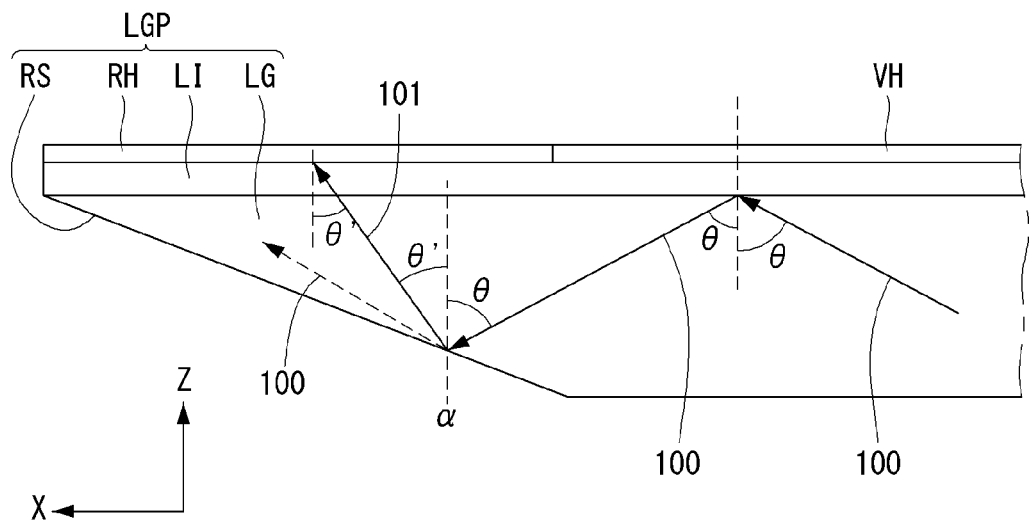
FIGS. 5A and 5B are enlarged side views illustrating a structure of a light reflecting part and a light path of the thin film type back light unit according to the first embodiment of the present disclosure.
Figure 5B:
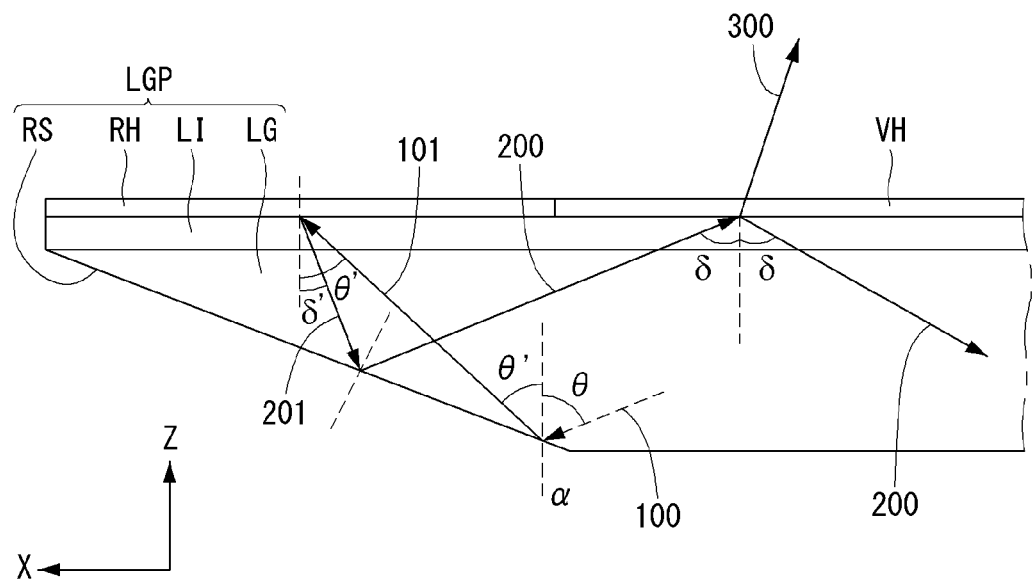

FIGS. 5A and 5B are enlarged side views illustrating a structure of a light reflecting part and a light path of the thin film type back light unit according to the first embodiment of the present disclosure. FIG. 6 is a plane view illustrating a structure of the light reflecting part and a light path of the thin film type back light unit according to the first embodiment of the present disclosure.

At the light reflecting part ⓒ, the reflective surface RS having a wedge shape is formed as an end surface of the high refractive film LG. The incident light 100 satisfying the total reflection condition propagates into the high refractive film LG and reaches the reflective surface RS. The wedge angle of the reflective surface RS, α, may satisfy the total reflection condition of the incident light 100. For example, the incident angle of the incident light 100 with respect to the reflective surface RS is (θ−α). This angle may satisfy the total reflection condition. Therefore, the angle of (θ−α), like θ, is greater than the critical angle for total reflection at a surface of the high refractive film LG.

The reflective light 101 totally reflected at the reflective surface RS enters into the light reflecting pattern RH. That is, the incident angle θ' of the reflective light 101 with respect to the upper surface of the high refractive film LG is an angle for breaking the total reflecting condition at an interface between the high refractive film LG and the low refractive film LI. Further, the incident angle θ' beneficially satisfies the angle for breaking the total reflecting condition at the upper surface of the low refractive film LI. Considering these conditions, the inclined angle (or, wedge angle) of the reflective surface RS, α, is beneficially selected between 1 degree to 5 degrees.

As explained above, the incident light 100 entering the reflective surface RS has an incident angle greater than θ. This incident light 100 is converted into a reflective light 101 having the incident angle θ' smaller than θ by being reflected at the reflective surface RS. When the incident angle θ' of the reflective light 101, which is reflected with the first order, is not an angle for breaking the total reflection condition at the interface of the high refractive film LG and the low refractive film LI, the reflective light 101 may not reach the light reflecting pattern RH, but be reflected at the interface so that it enters into the high refractive film LG and is reflected again by the reflective surface RS. When the incident light 100 is reflected twice by the reflective surface RS, the incident angle θ' may become much smaller than θ, as breaking the total reflection condition at the interface of the high refractive film LG and the low refractive film LI.

By these processes, all the reflective light 101 entering into the light reflecting pattern RH by being reflected from the reflective surface RS may have an incident angle converged to θ'. As seen on the X-Z plane, the reflective light 101 may be a collimated light on the Z-axis, with a similar incident angle on the vertical direction (Z-axis).

The vertically collimated reflective light 101 reflected by the reflective surface RS enters into the light reflecting pattern RH after passing through the high refractive film LG and the low refractive film LI. Actually, the reflective light 101 may be refracted at the upper surface of the high refractive film LG and the upper surface of the low refractive film LI. Herein, for brevity and ease of understanding, these refractions are, however, not considered and/or explained.

The light reflecting pattern RH converts the vertically collimated reflective light 101 into a collimated reflective light 201, which is also collimated in a horizontal direction, and sends it to the high refractive film LG again. The collimated reflective light 201 is reflected with an incident angle δ'. The incident angle of the collimated reflective light 201, δ', is beneficially smaller than the incident angle of the vertically collimated reflective light 101, θ'. When the incident angle of the collimated reflective light 201, δ', is equal to the incident angle of the vertically collimated reflective light 101, θ', the collimated reflective light 201 may follow a reverse path of the light path described hereinbefore. As a result, there may be no light radiated from the high refractive film LG. Therefore, the light reentering into the light guiding part ⓑ from the light reflecting part ⓒ can have an incident angle for breaking the total reflection condition at the upper surface of the high refractive film LG.

In order to satisfy these various conditions, the light reflecting pattern RH is beneficially an optical film having a holographic pattern. The holographic pattern is beneficially an interference pattern between the vertically collimated reflective light 101 and the collimated reflective light 201.

In the X-Y plane, the light reflecting pattern RH may be an optical element by which the expanded light propagating on the X-axis and expanding on the Y-axis is converted into a collimated light in which an expanded angle on the Y-axis of the light is collimated in a direction parallel to the X-axis. Further, referring to FIG. 5B, the collimated reflective light 201, which is collimated on vertical and horizontal directions by the light reflecting pattern RH, has an incident angle less than θ', so that it enters into the reflective surface RS. The collimated reflective light 201 collimated by the reflective surface RS has an incident angle of δ and propagates into the light guide film LGP, as a collimated light 200. Some of the collimated light 200 propagating into the light guide film LGP is radiated out from the light guide film LGP by the light radiating pattern VH, so that it may be generated as a back light 300.

The incident angle of the collimated light 200, δ, satisfies a condition in which the total reflection condition at the interface between the high refractive film LG and the upper surface of the low refractive film LI is broken. As a result, the incident angle of the collimated light 200, δ, is smaller than the incident angle of the incident light 100, θ. Especially, the incident angle of the collimated light 200, δ, is smaller than the critical angle for total reflection at the interface between the high refractive film LG and the upper surface of the low refractive film LI.

In the meantime, some of the collimated light 200 is radiated as the back light 300 by the light radiating pattern VH attached on the upper surface of the low refractive film LI. Also, some of the collimated light 200 reenters into the high refractive film LG, as it propagates into the incident surface IS.

In order to establish these light paths, the light radiating pattern VH beneficially has a refractive index greater than that of the low refractive film LI and smaller than that of the high refractive film LG. In these conditions, some of the collimated light 200 entering into the light radiating pattern VH from the low refractive film LI is refracted at an interface between the light radiating pattern VH and the low refractive film LI. Also, some of the collimated light 200 is reflected so as to reenter into the light guide film LGP. This reentered light is the collimated light 200 that propagates into the light guide film LGP by being reflected at a bottom surface of the high refractive film LG. In other words, at the light radiating pattern VH, some of the collimated light 200 is radiated, and some reenters into the light guide film LGP. Repeating these processes, some of the collimated light 200 is radiated as the back light 300, as the collimated light 200 propagates from the light reflecting part ⓒ to the light entering part ⓐ.

Hereinafter, the coordinate system for explaining the processes in which the incident expanded light 100 is to be converted into the collimated light 200 by the light guide film LGP and the light reflecting pattern RH, which are the main elements of the back light unit according to the present disclosure, will be described.

In the drawings following FIG. 3, a rectangular coordinate system represented by X-Y-Z axes is used. The source light from the light source LS propagates along the X-axis. In detail, in the X-Y plane, the light propagating along the X-axis is expanded to the Y-axis. In the X-Z plane, the light propagating along the X-axis is expanded to the Z-axis. For example, in FIG. 4, the dotted line parallel to the X-axis is a propagating direction of the expanded light 100, and the other arrowed lines indicate expanded directions of the expanded light 100.

After reflected by the reflective surface RS, the expanded light 100 is converted into a collimated light of which expanded angle on the Z axis is converged within a predetermined narrowed angle range, in the X-Z plane. This is referred to as a collimated light on the Z-axis or the vertically collimated light 101. Especially, an expanded width of a vertically collimated light 101 is very narrow, as much as a size of a light beam.

Also, the vertically collimated light 101, which is collimated on the Z-axis in the X-Z plane but are expanded on the Y-axis in the X-Y plane, is reflected by the reflective pattern RH so that it is converted into a collimated light in which the expanded angle on the Y-axis in the X-Y plane is converged. This is referred to as a collimated light on the Y-axis or a horizontally collimated light 201. Especially, the horizontally collimated light 201 has a collimated width corresponding to the Y-axis width of the light guide film LGP. Herein, the horizontally collimated light 201 is collimated after being reflected and vertically collimated by the reflective surface RS. That is, it is vertically and horizontally collimated, and thus, is referred to as the collimated light 200.

Hereinafter, the relationship and the light path between the light radiating pattern VH and the light guiding part ⓑ will be described with reference to FIGS. 7A and 7B.

Figure 7A:
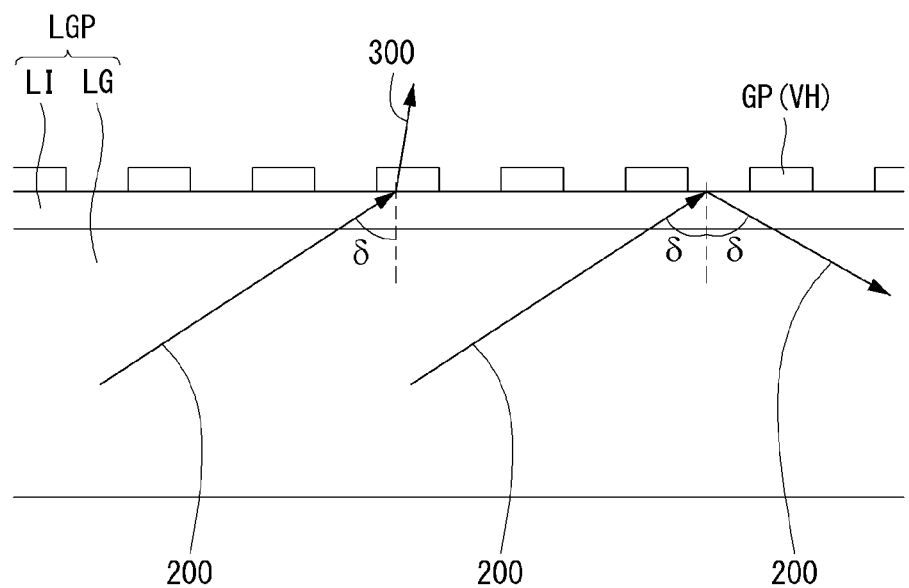
FIGS. 7A and 7B are enlarged side views illustrating a structure of and a light path in a light radiating part of an ultra-thin light guide film according to the first embodiment of the present disclosure.
Figure 7B:
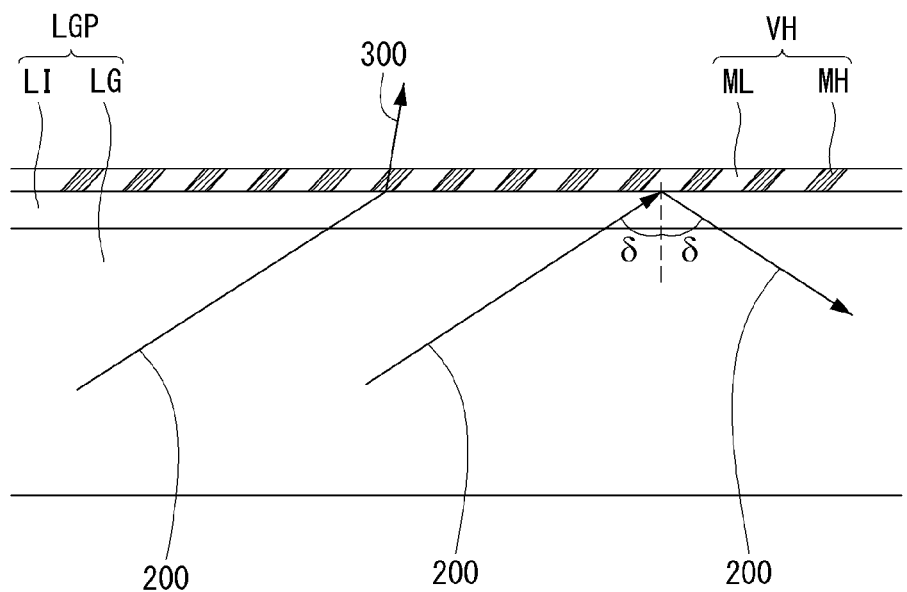

FIGS. 7A and 7B are enlarged side views illustrating a structure of and a light path in the light radiating part of the ultra-thin light guide film according to the first embodiment of the present disclosure.

First, a case in which the light radiating pattern VH includes a surface grating pattern will be described with reference to FIG. 7A.

The surface grating pattern may have a plurality of high refractive blocks GP arrayed on a film media. For example, on a film sheet having a low refractive index, a plurality of high refractive blocks GP may be evenly disposed. Alternatively, as illustrated in FIG. 7A, at the low refractive film LI, a plurality of high refractive blocks GP are patterned. Herein, the high refractive blocks GP may have the same or greater refractive index than the low refractive film LI and lower than the high refractive film LG.

After passing through an interface between the high refractive film LG and the low refractive film LI, the collimated light 200 enters into the upper surface of the low refractive film LI. Some of the collimated light 200 entering into the high refractive blocks GP may be refracted upward so that it is radiated as the back light 300 from the light guide film LGP. Also, some of the collimated light 200 entering into an area where no high refractive blocks GP are disposed may be totally reflected at an interface between the low refractive film LI and the air, so that it reenters into the light guide film LGP.

The collimated light 200 reentering into the light guide film LGP is totally reflected by a bottom surface of the high refractive film LG into the upper surface again. Some of the collimated light 200 reflected toward the upper surface is radiated as the back light 300, as described above, and some propagates through the light guide film LGP as the collimated light 200.

Next, a case in which the light radiating pattern VH includes a volume grating pattern will be described with reference to FIG. 7B.

The volume grating pattern may include a plurality of high refractive particles (or 'molecules') MH in a low refractive film media ML. Especially, the high refractive particles MH are disposed in a slanted pattern in a cross-sectional view. Herein, the low refractive film media ML beneficially has a refractive index lower than the low refractive film LI. Further, the high refractive particle MH beneficially has a refractive index greater than the low refractive film media ML. In particular, the high refractive particle MH beneficially has a refractive index greater than the low refractive film LI.

After passing through an interface between the high refractive film LG and the low refractive film LI, the collimated light 200 enters into an upper surface of the low refractive film LI. Some of the collimated light 200 entering into the high refractive particles MH may be refracted upward so that it is radiated as the back light 300 from the light guide film LGP. Also, some of the collimated light 200 entering into the low refractive film media ML where no high refractive particles MH are disposed may be totally reflected at an upper surface of the low refractive film LI, so that it reenters into the light guide film LGP.

The collimated light 200 reentering into the light guide film LGP is totally reflected by a bottom surface of the high refractive film LG toward the upper surface again. Some of the collimated light 200 reflected toward the upper surface is radiated as the back light 300, as described above, and some of the collimated light 200 propagates through the light guide film LGP as the collimated light 200.

According to the first embodiment of the present disclosure, at the light entering part, the expanded light radiated from the light source LS is converted into an incident light satisfying a total reflection condition of a high refractive film. The incident light propagates into the light guiding part and reaches the light reflecting part. At the light reflecting part, the incident light is converted into a collimated light in vertical and horizontal directions. As the collimated light passes through the light guiding part again in a reversed direction, it is radiated as the back light by the light radiating part. The back light 300 is a collimated light similar to, for example, a search light. As a result, the back light unit can be used for a 3D display system in which the light for right eye images is sent to the right eye and the light for left eye images is sent to the left eye, selectively.

Thus far, a structure of a back light unit and a light path for generating a back light in the back light unit according to the first embodiment of the present disclosure are described. Hereinafter, other embodiments of the present disclosure will be described, in which the basic light paths may be the same as the first embodiment so that a detailed explanation thereof will not be duplicated.

Second Embodiment

Figure 6:
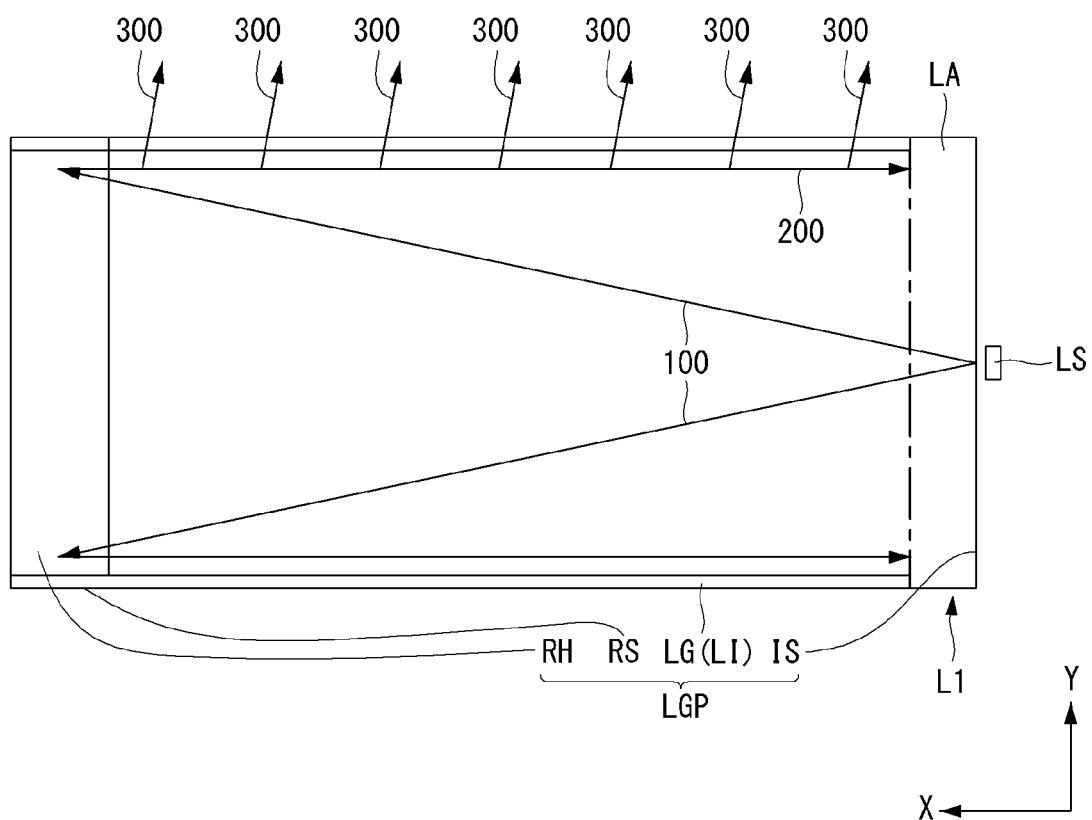
FIG. 6 is a plane view illustrating a structure of the light reflecting part and a light path of the thin film type back light unit according to the first embodiment of the present disclosure.

In the first embodiment, as illustrated in FIG. 6, the light source LS is located at a center of the incident surface IS. In FIG. 3, the light sources LS can be located at any position along with the incident surface IS. Hereinafter, the second embodiment of the present disclosure will be described with reference to FIGS. 8A to 8C.

Figure 8A:
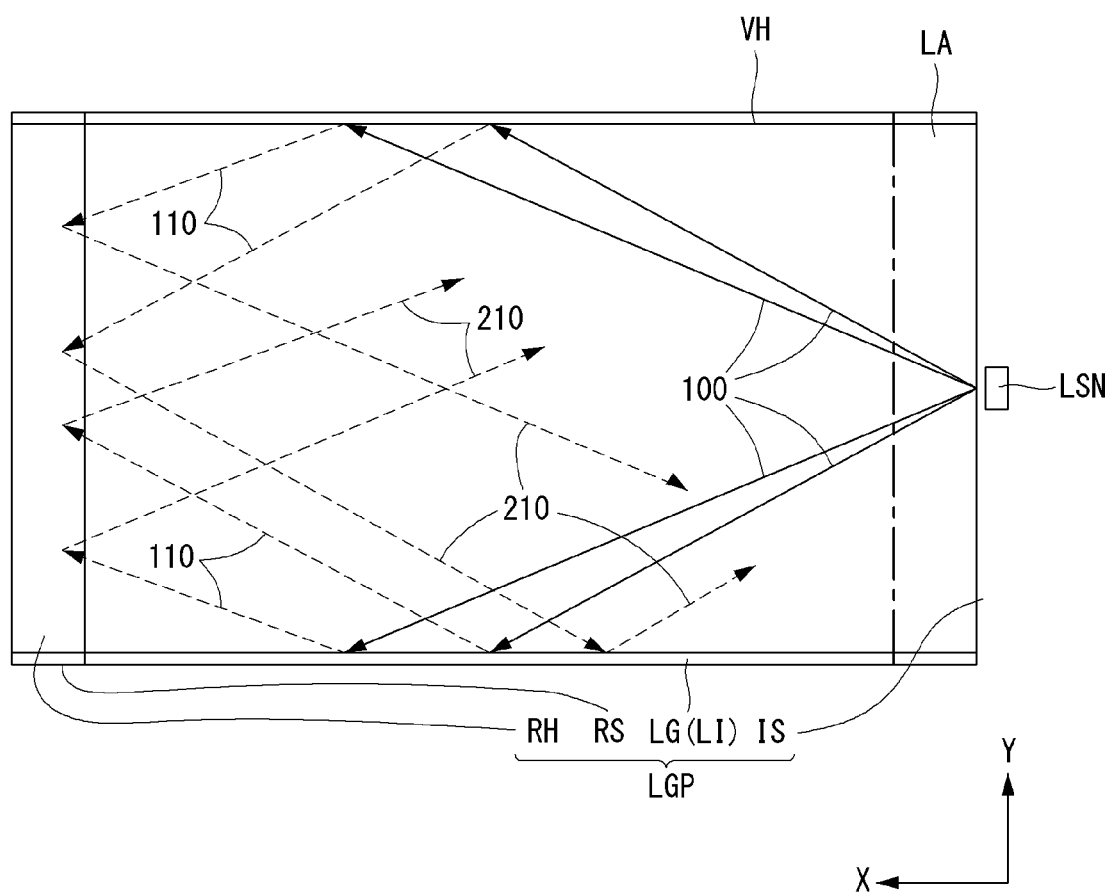
FIG. 8A is a plane view illustrating a light path of an expanded light in which a light source is disposed at a center of an incident surface according to the second embodiment of the present disclosure.
Figure 8B:
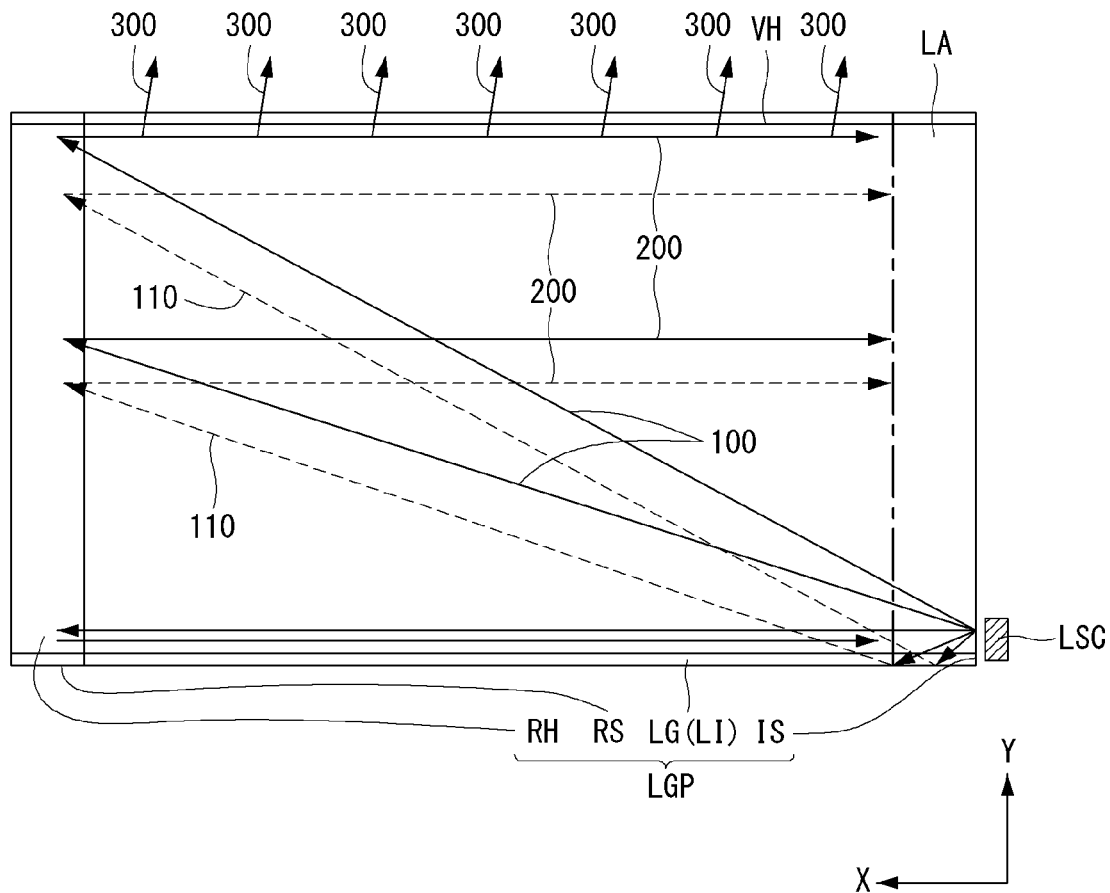
FIG. 8B is a plane view illustrating a structure of and a light path in a thin film type back light unit having a light source for a 3D image according to the second embodiment of the present disclosure.
Figure 8C:
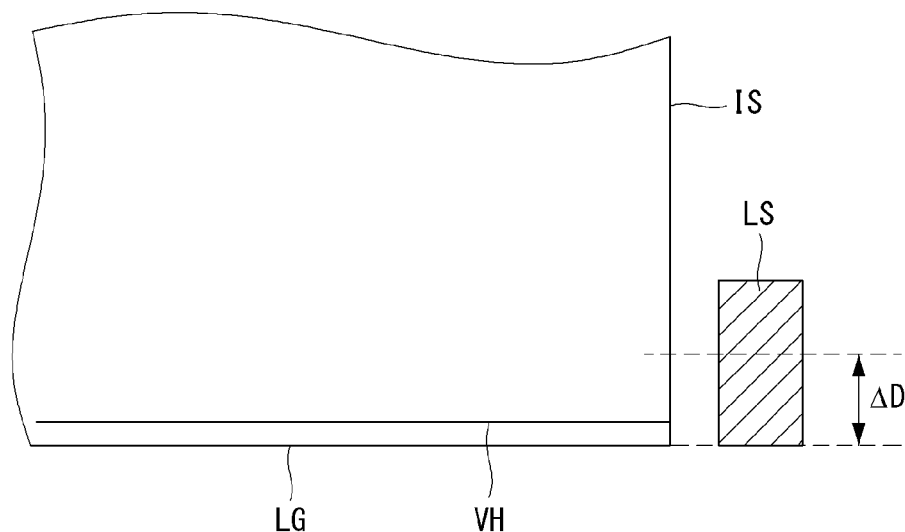
FIG. 8C is an enlarged plane view illustrating an arrangement of light sources for a 3D image according to the second embodiment of the present disclosure.

FIG. 8A is a plane view illustrating a light path of an expanded light in which a light source is disposed at a center of an incident surface according to the second embodiment of the present disclosure. FIG. 8B is a plane view illustrating a structure of and a light path in a thin film type back light unit having a light source for a 3D image according to the second embodiment of the present disclosure. FIG. 8C is an enlarged plane view illustrating an arrangement of light sources for a 3D image according to the second embodiment of the present disclosure.

First, a light path of an expanded light when a light source is disposed at a center of an incident surface will be described with reference to FIG. 8A.

In a case where a light source LS provides an expanded light having less than 60 degrees of expanded angle as illustrated in FIG. 6, most of all the incident light starting from the incident surface IS may propagate into a light reflecting pattern RH. However, when the light source LS is a general purposed LED, the light source LS provides an expanded light having 60 degrees or more of expanded angle. Also, when the back light unit is applied to a wide-type display system, the long side is further lengthened, as compared with a general display system.

In these cases, as illustrated in FIG. 8A, most of the light starting from the incident surface IS may not propagate into the light reflecting pattern RH directly. That is, some of the light propagates into the two longitudinal sides of a light guide film LGP. This incident light 100 is reflected by the sides and directed into the light guide film LGP, and then travels to the light reflecting pattern RH. However, this side reflective light 110 may act differently from the incident light 100 at the light reflecting pattern RH. That is, the side reflective light 110 may be a scattered (or 'diffused') light 210 that is not collimated or scattered-reflected in arbitrary directions.

The scattered light 210 may be radiated out by a light radiating pattern VH. However, the scattered light 201 may be converted into a scattered back light, not a collimated back light 300. As the scattered back light may not have collimated property, it may not be used as a back light for displaying 3D images, but it can be used as a back light for displaying 2D images.

In a case where the incident light provided from the light source has a wide expanded angle so that all the light may not be directly propagate into the light reflecting part from the light entering part, especially when the light source is used for a 3D display system, a light absorbing element may be beneficially attached on a side of the light guide film LGP. In this case, an amount of light may be lowered due to the light absorbed by the light absorbing element, thereby reducing light efficiency.

In the second embodiment, a 3D display back light unit in which a light source position is optimized for improving or maximizing light efficiency will be described with reference to FIG. 8B.

In the second embodiment, a 3D light source LSC is beneficially disposed at any one corner (or 'edge') of the incident surface. For example, the 3D light source LSC may be disposed at a corner where the incident surface IS and a lower long side L1 are crossing and/or where the incident surface IS and an upper long side L1 are crossing.

The 3D light source LSC may provide an expanded light having 120 degrees of expanded angle. After selecting the incident light 100 satisfying a total reflection condition from the expanded light, the incident light 100 still has 120 degrees of expanded angle in the X-Y plane. As the 3D light source LSC is disposed at a corner where the incident surface IS and the lower long side L1 are crossing, the incident light 100 having an expanded angle of 0 to +60 degrees may directly propagate into the light reflecting pattern RH. On the other hand, the incident light 100 having an expanded angle of 0 to −60 degrees may be totally reflected by the lower long side L1 and enter into the light guide film LGP as a side reflective light 110.

The side reflective light 110 may satisfy similar or the same condition as the incident light 100. That is, one half of the incident light 100 may directly enter into the light guide film LGP, and the other half of the incident light 100 may be folded by the lower long side L1, which works like a mirror, and then enter into the light guide film LGP. As a result, the incident light 100 may be converted into a collimated light 200 in vertical and horizontal directions by the reflective surface RS and the reflective pattern RH, and then it can be radiated out from the light guide film LGP as a back light 300. Further, as the side reflective light 110 has the same property as the incident light 100, it may be converted into the collimated light 200 in vertical and horizontal directions by the reflective surface RS and the reflective pattern RH, and then it can be radiated out from the light guide film LGP as the back light 300.

As illustrated in FIG. 8B, the 3D light source LSC disposed at any one corner can be converted into the highly collimated back light 300 by the light guide film LGP according to the second embodiment of the present disclosure. Especially, it has a higher efficiency than the case where the 3D light source LSC is disposed at a middle portion of the incident surface IS. Further, with the 3D light source LSC, the 2D light sources LSN (which have the same property as the 3D light source LSC) can be disposed at middle portions of the incident surface IS, as illustrated in FIG. 8A. In that case, the 3D light source LSC disposed at the corner may be used for displaying 3D images only, while the 2D light sources LSN disposed at the middle portions of the incident surface IS and having a scattered reflective property may be used for displaying 2D images only. By having these 2D and 3D light sources LSN and LSC together and switching (selectively on or off) them, it is possible to represent 2D images and 3D images selectively. That is, although the 3D light source LSC and the 2D light source LSN are the same LEDs, they can function as the 3D light source LSC or the 2D light source LSN depending on their positions.

Referring to FIG. 8C, the 3D light source LSC for providing the collimated back light 300 may be disposed at a corner of the light guide film LGP. A center line of the 3D light source LSC is beneficially located as being apart from the lower long side L1 with a predetermined distance, ΔD. The predetermined distance, ΔD, between the center of the 3D light source LSC and the lower long side L1 may be in a range of 1 to 3 mm. To improve light efficiency, an outer end side of the 3D light source LSC may be located on an extended line from the lower long side L1 of the light guide film LGP.

Third Embodiment

Hereinafter, a thin film type back light unit according to the third embodiment of the present disclosure will be described with reference to FIGS. 9 and 10.

Figure 9:
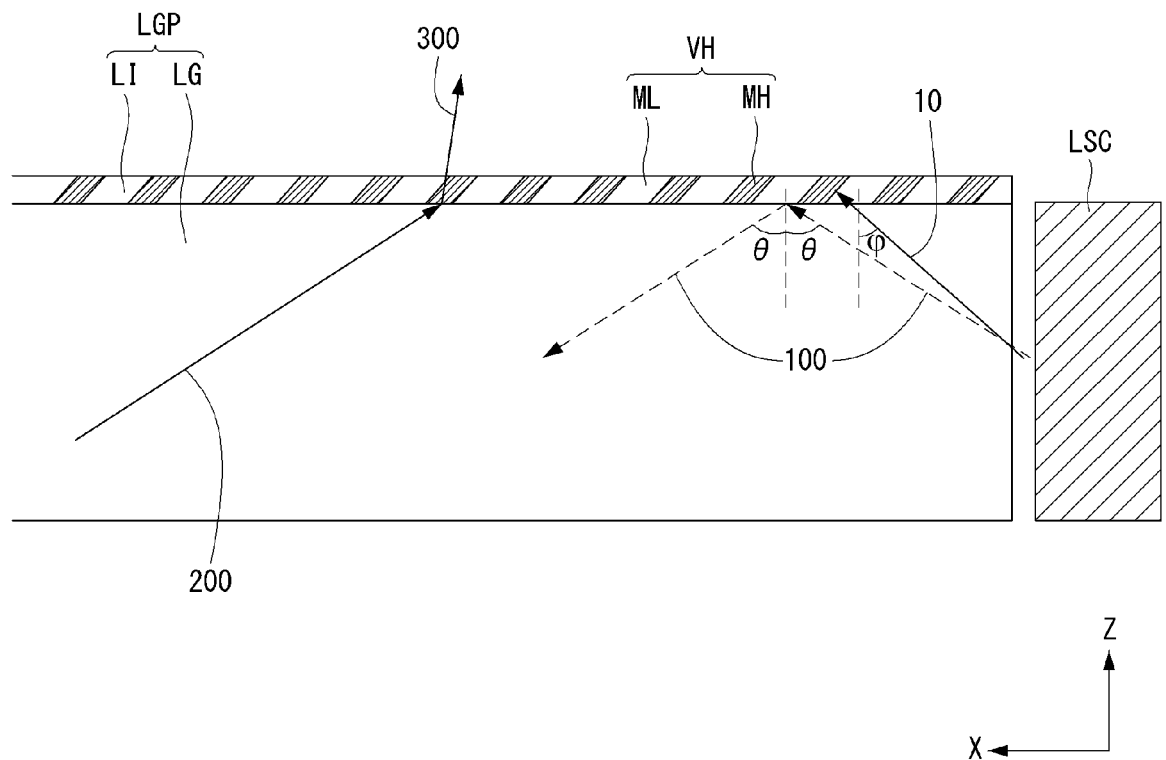
FIG. 9 is an enlarged side view illustrating a structure of and a light path in a thin film type back light unit according to the third embodiment of the present disclosure.

FIG. 9 is an enlarged side view illustrating a structure of and a light path in a thin film type back light unit according to the third embodiment of the present disclosure. FIG. 10 is a side view illustrating a structure of the thin film type back light unit according to the third embodiment of the present disclosure.

In a case where a light radiating pattern VH is a volume grating pattern as in the first embodiment, a low refractive film LI may not be included. Especially, when a high refractive particle MH has a refraction index lower than a high refractive film LG, that is, when the light radiating pattern VH having a lower refraction index than the high refractive film LG is on the high refractive film LG, the low refractive film LI may be omitted.

Further, in a case where the light radiating pattern VH is a volume grating pattern, a light absorbing pattern LA may also be omitted. As illustrated in FIG. 9, the expanded light having an incident angle greater than a total reflection critical angle at an interface between the high refractive film LG and the light radiating pattern VH may be totally reflected and enter into the high refractive film LG as the incident light 100. Some of the expanded light 10 having an incident angle smaller than the total reflection critical angle at the interface between the high refractive film LG and the light radiating pattern VH may enter into the light radiating pattern VH from the high refractive film LG, but it may be re-refracted by the high refractive particle MH so that it may not be radiated out. Therefore, even though the light absorbing pattern LA is not included, there may not be any noise light generated by a scattering reflection of the some of the expanded lights 10 having an incident angle smaller than the total reflection critical angle.

The volume grating pattern can be designed for the light to radiate out in a specific direction. For example, some of the light entering into the volume grating in parallel to a slanted side of the volume grating pattern, similar to the collimated light 200, may be refracted so as to be radiated out as a back light, and some may be reflected and enter into the high refractive film LG. Among the light from the light source LS, the light entering into the volume grating pattern in perpendicular to the slanted side of the volume grating pattern, similar to the expanded light 10 having an incident angle smaller than the total reflection critical angle at the interface between the high refractive film LG and the light radiating pattern VH, may be totally reflected or optically extinct.

Figure 10:
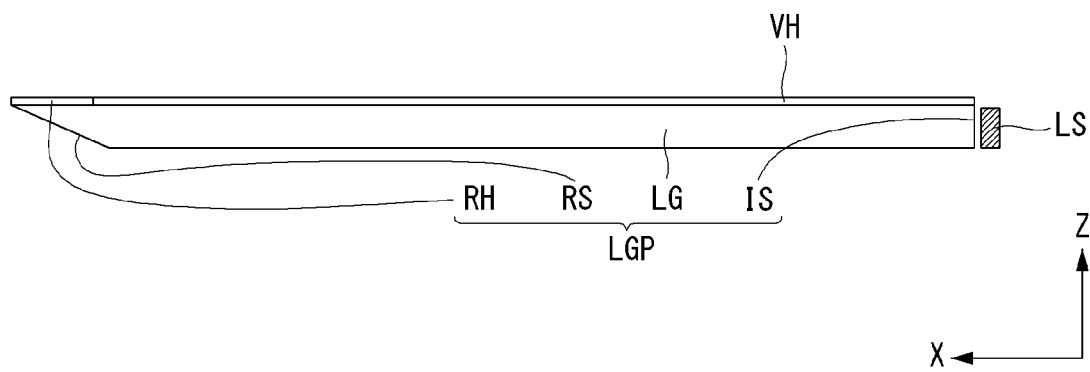
FIG. 10 is a side view illustrating a structure of the thin film type back light unit according to the third embodiment of the present disclosure.

Considering these conditions, the ultra-thin back light unit according to the third embodiment of the present disclosure may have the simplest structure, as illustrated in FIG. 10.

Referring to FIG. 10, the ultra-thin back light unit according to the third embodiment of the present disclosure comprises a light guide film LGP, a light radiating pattern VH and a light source LS. The light guide film LGP includes an incident surface IS on which the light source LS is disposed, a reflective surface RS having a wedge angle at an opposite surface to the incident surface IS, and a high refractive film LG having the same thickness between the incident surface IS and the reflective surface RS. The light radiating pattern VH is attached on the upper surface of the high refractive film LG. The light source LS is disposed near the incident surface IS.

The light guide film LGP includes a light entering part, a light guiding part and a light reflecting part. The light entering part has the incident surface IS, facing the light source LS, so as to receive an expanded light from the light source and convert it into an incident light 100. The light reflecting part facing the light entering part converts the incident light 100 into a collimated light 200 in vertical and horizontal directions. The light guiding part has the high refractive film LG connecting the light entering part and the light reflecting part. The light guiding part receives the incident light 100 from the light entering part and sends (or 'transmits') it to the light reflecting part. Further, the light guiding part receives the collimated light 200 from the light reflecting part and sends it to the light entering part.

The light radiating pattern VH is disposed on an upper surface of the high refractive film LG of the light guiding part, and provides the back light 300 from some of the collimated light 200. The light radiating pattern VH sends some of the collimated light 200 into the high refractive film LG as the collimated light 200. The collimated light 200 returned into the high refractive film LG is totally reflected by an interface between the bottom surface of the high refractive film LG and the air so that it propagates into the light entering part. As propagating into the light entering part along these light paths, the collimated light 200 is converted into a back light 300 evenly distributed over a whole surface of the light guide film LGP by the light radiating pattern VH.

Fourth Embodiment

Hereinafter, The fourth embodiment of the present disclosure will be described with reference to FIG. 11.

Figure 11:
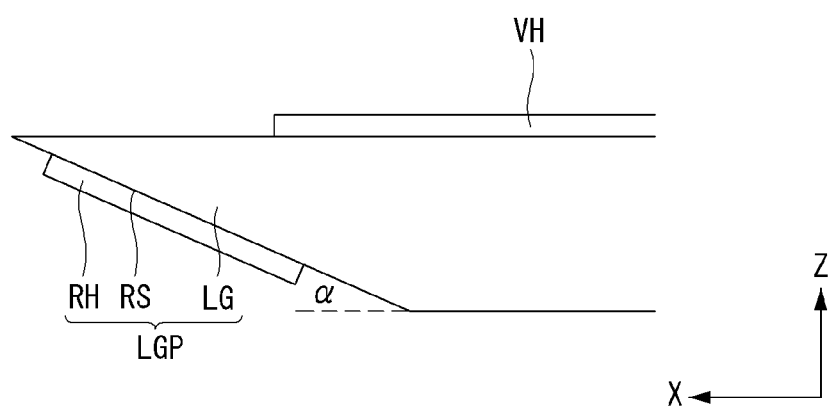
FIG. 11 is an enlarged side view illustrating a structure of a thin film type back light unit according to the fourth embodiment of the present disclosure.

FIG. 11 is an enlarged side view illustrating a structure of a thin film type back light unit according to the fourth embodiment of the present disclosure. For brevity, one example of a light reflecting part will be described in the fourth embodiment with reference to FIG. 11.

The light reflecting part according to the fourth embodiment of the present disclosure comprises a reflective surface RS, which is a wedge side (or 'slanted side') expanding from the high refractive film LG and having a thickness gradually thinned, and a reflective pattern RH attached on a reflective surface RS. In the third embodiment, the reflective pattern RH is attached on the upper surface of the high refractive film LG, facing the reflective surface RS.

In the fourth embodiment, the reflecting pattern RH is differently positioned as compared to the third embodiment. It should be appreciated that the features of the fourth embodiment can also be applied to each of the first and second embodiments.

Fifth Embodiment

Hereinafter, The fifth embodiment of the present disclosure will be described with reference to FIGS. 12A and 12B.

Figure 12A:
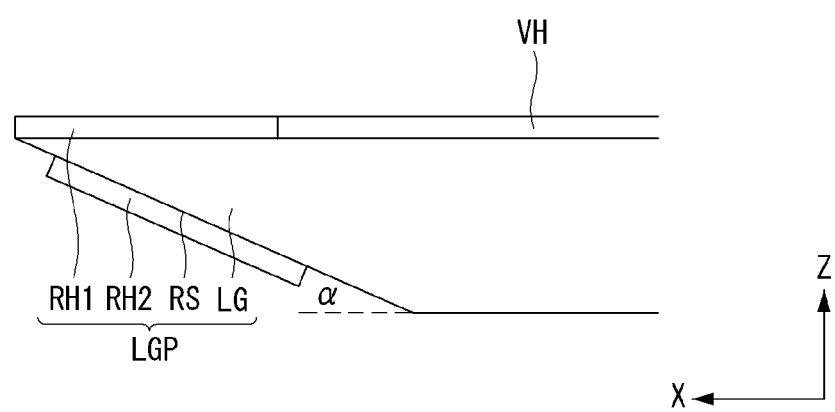
FIG. 12A is an enlarged side view illustrating a structure of a thin film type back light unit according to the fifth embodiment of the present disclosure.

FIG. 12A is an enlarged side view illustrating a structure of a thin film type back light unit according to the fifth embodiment of the present disclosure. FIG. 12B is a plane view illustrating a structure of and a light path in the thin film type back light unit according to the fifth embodiment of the present disclosure.

Referring to FIG. 12A, a light reflecting part according to the fifth embodiment of the present disclosure includes a reflective surface RS, which is a wedge side (or 'slanted side') expanding from the high refractive film LG and having a thickness gradually thinned. On the upper surface of the high refractive film LG, a first reflective pattern RH1 is attached, facing the reflective surface RS. Further, on the reflective surface RS, a second reflective pattern RH2 is directly attached. As having two reflective patterns RH1 and RH2, two light sources LS are desired.

Figure 12B:
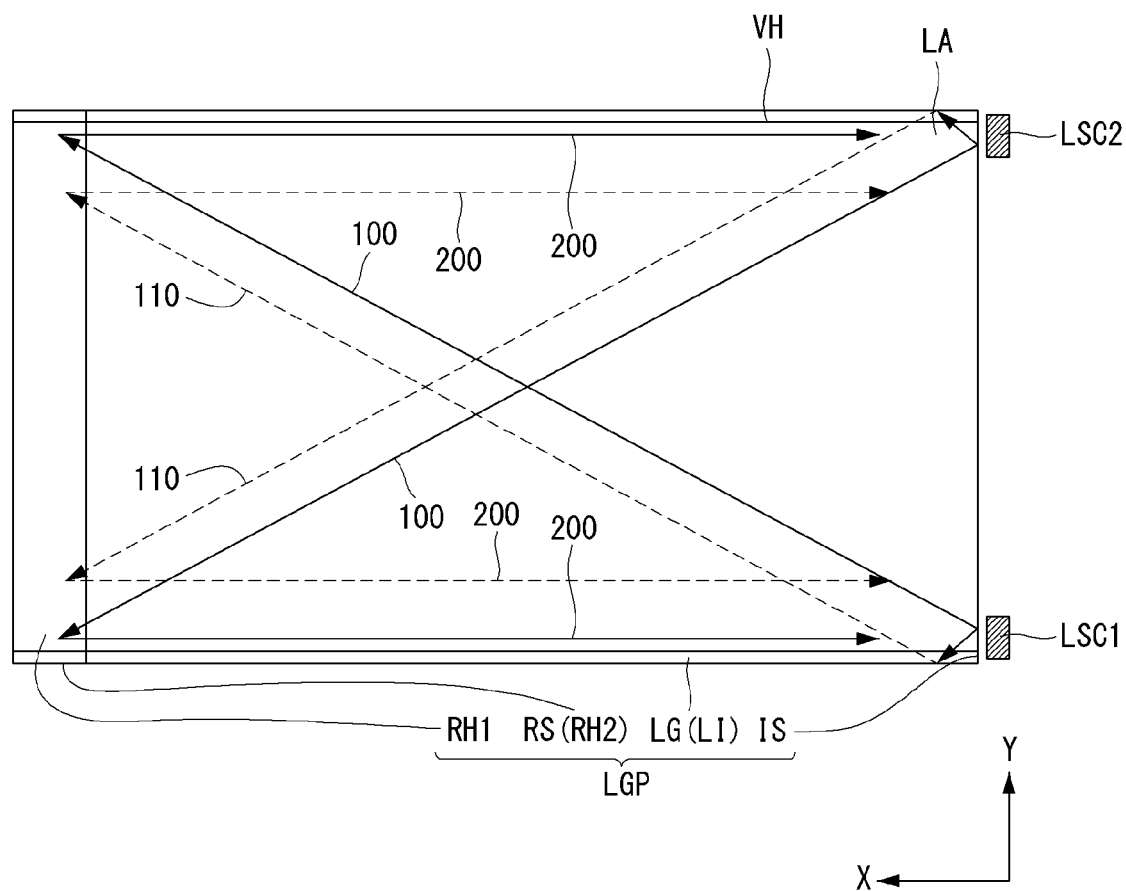
FIG. 12B is a plane view illustrating a structure of and a light path in the thin film type back light unit according to the fifth embodiment of the present disclosure.

Referring to FIG. 12B, there are two light sources LSC on an incident surface IS of a light guide film LGP. For example, a first light source LSC1 is disposed at a corner where the incident surface IS and a lower long side L1 are crossing, and a second light source LSC2 is disposed at a corner where the incident surface IS and an upper long side L2 are crossing.

Working with the reflective surface RS, the first reflective pattern RH1 may convert an incident light 100 and a side reflective light 110 provided by the first light source LSC1 into a collimated light 200. Also, working with the reflective surface RS, the second reflective pattern RH2 may convert an incident light 100 and a side reflective light 110 provided by the second light source LSC2 into the collimated light 200.

In view of optical science and technology, the first reflective pattern RH1 may correspond to one half of a parabola mirror of which focus is on a position of the first light source LSC1. Further, the second reflective pattern RH2 may correspond to one half of a parabola mirror of which focus is on a position of the second light source LSC2. As a result, when formed as holographic optical elements, the first reflective pattern RH1 and the second reflective pattern RH2 have different holographic patterns.

Sixth Embodiment

Hereinafter, the sixth embodiment of the present disclosure with be described with reference to FIGS. 13A and 13B.

Figure 13A:
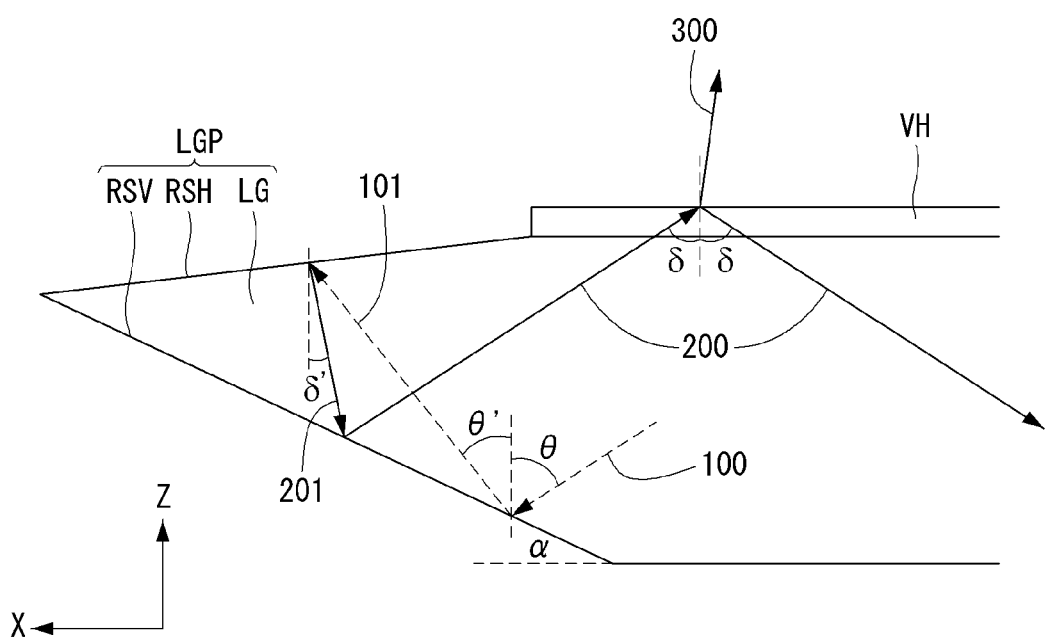
FIG. 13A is an enlarged side view illustrating a light reflecting part of a thin film type back light unit according to the sixth embodiment of the present disclosure.

FIG. 13A is an enlarged side view illustrating a light reflecting part of a thin film type back light unit according to the sixth embodiment of the present disclosure. FIG. 13A is a left side view, as seen at the light reflecting side, illustrating a structure of the ultra-thin light guide film according to the sixth embodiment of the present disclosure.

The sixth embodiment describes a case in which physical optical elements are used instead of holographic optical elements. That is, the sixth embodiment is described for explaining physical and optical backgrounds of a reflective pattern RH, which is a holographic optical element.

Referring to FIG. 13A, a light reflecting part of a light guide film LGP includes a vertical collimation reflective surface RSV and a horizontal collimation reflective surface RSH. The vertical collimation reflective surface RSV may correspond to the reflective surface RS described in the first to fifth embodiments. In the sixth embodiment, the horizontal collimation reflective surface RSH is formed instead of the reflective pattern RH.

In FIG. 13A, a side structure of the horizontal collimation reflective surface RSH is illustrated. As an incident light 100 is reflected by the vertical collimation reflective surface RSV, it is converted into a reflective light 101 which is vertically collimated, or collimated on the Z-axis. Reflected by the horizontal collimation reflective surface RSH, the reflective light 101 is converted into a collimated reflective light 201 that is horizontally collimated, or collimated on the X-axis. And then, the collimated reflective light 210 returns to the vertical collimation reflective surface RSV. At this time, as the collimated reflective light 201 has an incident angle smaller than the incident angle of the reflective light 101, the angle between the horizontal collimation reflective surface RSH and the reflective light 101 is larger than 90 degrees. If the horizontal collimation reflective surface RSH is perpendicular to the reflective light 101, the collimated reflective light 201 is substantially identical to the reflective light 101, and thus, the collimated light 200 would be identical to the incident light 100, resulting in no back light 300.

In the meantime, the horizontal collimation reflective surface RSH makes the incident light 100 be collimated along the X-axis. That is, the horizontal collimation reflective surface RSH is beneficially a mirror corresponding to some portions of a parabola of which focus is on the light source.

Figure 13B:
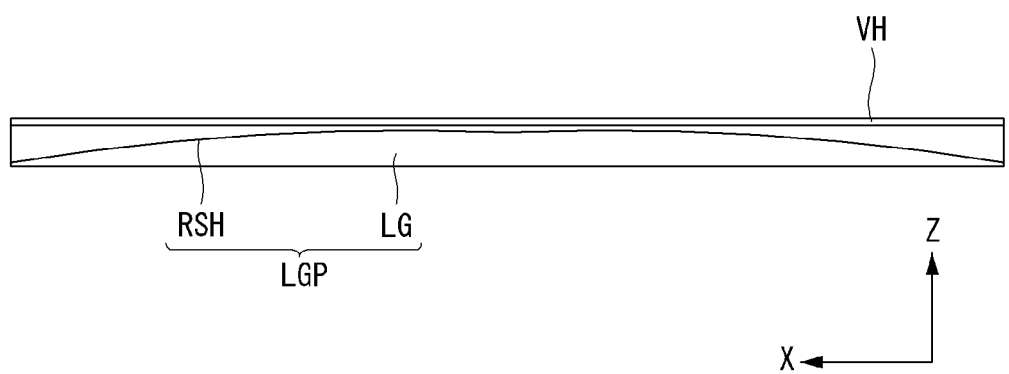
FIG. 13B is a side view, as seen from the light reflecting side, illustrating a structure of an ultra-thin light guide film according to the sixth embodiment of the present disclosure.

Referring to FIG. 13B, the horizontal collimation reflective surface RSH is represented as some portions of a parabola. In this case, as the focus of the parabola is disposed on a center on the X-axis, the light source LS is beneficially located on a center of an incident surface IS. It may be difficult to form a parabola mirror in an ultra-thin back light unit. Thus, holographic elements are beneficially used in an ultra-thin back light unit according to an embodiment of the present disclosure.

It will be apparent to those skilled in the art that various modifications and variation can be made in the present invention without departing from the concepts and scope of the invention. Thus, it is intended that the present invention cover the modifications and variations of this invention provided they come within the scope of the appended claims and their equivalents.

What is claimed is:

1. A back light unit comprising:
   a light guide film including a light guiding part having a first side and a second side, a light entering part at the first side, a light reflecting part at the second side and the light guiding part between the light entering part and the light reflecting part;
   a light radiating part on an upper surface of the light guide film; and
   a light source adjacent to the light entering part of the light guide film, the light source providing an expanded light toward the light entering part,
   wherein the light entering part permits entry among the expanded light, incident light of the expanded light that satisfies a total reflection condition to propagate from the first side to the second side of the light guiding part,
   the light reflecting part that receives the incident light provided from the light guiding part converts the incident light into collimated light and propagates the collimated light to the light guiding part, and
   the light radiating part provides back light to a display panel as the collimated light propagates from the second side to the first side of the light guiding part,
   wherein the light guide film including the light entering part, the light guiding part and the light reflecting part is a high refractive film,
   the light radiating part includes a light radiating pattern that radiates the back light using a first portion of the collimated light and reflects a second portion of the collimate light into the light guiding part, and
   the high refractive film has a refractive index greater than the light radiating pattern.

2. The back light unit according to claim 1, further comprising a reflective pattern at the light reflecting part that collimates the incident light in a first direction, and a reflective surface at the light reflecting part that collimates the incident light in a second direction different from the first direction.

3. The back light unit according to claim 2, wherein the reflective surface at the light reflecting part has any one of an inclined surface and an inclined arc surface, and has a wedge angle with respect to a surface of the light guiding part.

4. The back light unit according to claim 2, wherein the reflective pattern includes at least any one of:
a first reflective pattern on the reflective surface; and
a second reflective pattern on an upper surface of the high refractive film, facing the reflective surface.

5. The back light unit according to claim 1, wherein the light radiating pattern refracts the first portion of the collimated light of which incident angle is less than a total reflective critical angle at an interface between the high refractive film and the light radiating pattern into the light radiating pattern, and reflects the second portion of the collimated light into the high refractive film, and
the first portion of the collimated lights refracted into the light radiating pattern is radiated outside.

6. The back light unit according to claim 1, wherein the light guide film further comprises a low refractive film attached on an upper surface of the high refractive film, and
the low refractive film has a refractive index lower than the high refractive film and the light radiating pattern.

7. The back light unit according to claim 1, wherein the light entering part further includes a light absorbing pattern on an upper surface of the entering part that removes a portion of the expanded light of which incident angle is smaller than a critical angle satisfying a total reflection condition.

8. The back light unit according to the claim 1, wherein the light guide film includes:
a first long side and a second long side which are parallel with each other; and
a first short side at the light entering part and a second short side at the light reflecting part which are parallel with each other and are crossing the first long side and the second long side, and
the light source is disposed along the first short side.

9. The back light unit according to claim 8, wherein the light source further includes a 3D light source adjacent to any one of the first long side and the second long side.

10. The back light unit according to claim 1, wherein the light radiating pattern includes any one of a surface grating pattern and a volume grating pattern.

11. A light guide film comprising:
a light guiding part having a first side and a second side;
a light entering part at the first side; and
a light reflecting part at the second side, the light guiding part being between the light entering part and the light reflecting part,
wherein the light entering part permits entry among expanded light, incident light of the expanded light provided from a light source that satisfies a total reflection condition to propagate from the first side to the second side of the light guiding part, and
the light reflecting part that receives the incident light provided from the light guiding part converts the incident light into collimated light and propagates the collimated light to the light guiding part, wherein the light guide film including the light entering part, the light guiding part and the light reflecting part is a high refractive film,
wherein a light radiating pattern at an upper surface of the high refractive film and configured to radiate back light using a first portion of the collimated light and to reflect a second portion of the collimate light into the light guiding part, and
wherein the high refractive film has a refractive index greater than the light radiating pattern.

12. The light guide film according to claim 11, further comprising:
a reflective surface at the light reflecting part and configured to collimate the incident light in a first direction; and
a reflective pattern at the light reflecting part and configured to collimate the incident lights in a second direction different from the first direction.

13. The light guide film according to claim 12, wherein the reflective surface at the light reflecting part has any one of an inclined surface and an inclined arc surface, and has a wedge angle to a surface of the light guiding part.

14. The light guide film according to claim 12, wherein the reflective pattern includes at least any one of:
a first reflective pattern disposed on the reflective surface; and
a second reflective pattern disposed on an upper surface of the high refractive film, facing the reflective surface.

15. The light guide film according to claim 13, wherein the light radiating pattern is configured to refract the first portion of the collimated light of which incident angle is less than a total reflective critical angle at an interface between the high refractive film and the light radiating pattern into the light radiating pattern, and
to reflect the second portion of the collimated light into the high refractive film, and
wherein the first portion of the collimated light refracted into the light radiating pattern is radiated outside.

16. The light guide film according to the claim 12, further comprising a low refractive film attached on an upper surface of the high refractive film,
wherein the low refractive film has a refractive index lower than the high refractive film and the light radiating pattern.

17. The light guide film according to the claim 12, wherein the light radiating pattern includes any one of a surface grating pattern and a volume grating pattern.

18. The light guide film according to the claim 11, wherein the light entering part further includes a light absorbing pattern disposed on an upper surface of the light entering part and configured to remove a portion of the expanded light of which incident angle is smaller than a critical angle satisfying a total reflection condition.

19. The light guide film according to the claim 11, further comprising:
a first long side and a second long side which are parallel with each other; and
a first short side disposed at the light entering part and a second short side disposed at the light reflecting part which are parallel with each other and are crossing with the first long side and the second long side.

* * * * *